UNITED STATES PATENT OFFICE.

LEE C. SHARP, OF PLATTSMOUTH, NEBRASKA, ASSIGNOR TO ALFA-MAIZE MANUFACTURING COMPANY, OF WILMINGTON, DELAWARE.

ANIMAL FOOD COMPOSITION AND METHOD FOR PREPARING SAME.

1,395,746. Specification of Letters Patent. Patented Nov. 1, 1921.

No Drawing. Application filed September 2, 1919. Serial No. 321,060.

*To all whom it may concern:*

Be it known that I, LEE C. SHARP, a citizen of the United States, and a resident of Plattsmouth, in the county of Cass and State of Nebraska, have invented certain new and useful Improvements in Animal Food Compositions and Methods for Preparing Same, of which the following is a specification.

My invention relates to compositions for feeding animals such as horses, cattle, sheep, swine and the like, and to methods for preparing such food or feeding compositions. It is the principal or primary object of my invention to effect the enormous conservation of food material for livestock, resulting from making the nutritive values of corn stover available for general commercial stock-feeding use. More particularly, it is the object of my invention to provide an economical stock-food in which there is utilized the entire mature plant of maize or Indian corn, the same being placed in a physical condition such that it may be stored, shipped and fed without waste, and such that it may be readily combined with other ingredients necessary to produce a properly balanced ration for animals of any class. Before proceeding to describe in detail how the above noted general results are attainable by the use of my invention, and in order that the distinctive characteristics thereof may be clearly apprehended, I will briefly outline the problem presented, the principal ways in which the solution thereof has been heretofore attempted, and the respects in which such methods fail to fully attain the desired results.

While maize or Indian corn is the principal stock-feeding crop grown in this country, the common and general practice of utlizing only the actual grain or seed-portion of the plant results in loss and waste of about 40% of the feeding values of the entire mature plant. Authoritative analyses show that on the average only about 60% of the total digestible nutrients of the whole mature corn plant are contained in the actual grain, and the remainder is found in the "stover."

("Stover" is the material remaining after removal of the grain or ears from corn "fodder." Corn "fodder" is the entire corn plant, as cut off slightly above the ground at about the time that the plant reaches maturity, or subsequently thereto, and in a substantially dried or cured condition. In the following description the foregoing terms are to be understood as above defined.)

The simplest method of utilizing corn stover consists merely in pasturing animals in the corn fields after the harvesting of the grain. This method is very wasteful, of course, as only a small portion of the plant is actually eaten, practically all of the coarser stalk portions being rejected, and even a large part of the leaves being trampled and not used. Morever, fodder or stover pasturage is quite dangerous, particularly for cattle, causing in the latter the highly fatal "cornstalk disease," and sometimes causing serious digestive disturbances in other animals.

A larger proportion of the corn plant is utilized when the same is shredded, whereby the stalk and coarser parts generally are split longitudinally into fibrous hay-like strands or shreds. A considerable part of the shredded fodder is rejected and remains uneaten, however, as portions of the shredded material are lacking in flavor and palatableness, and the animals tend to pick over the loose material and select only those portions which are satisfactory to them. Shredded fodder is also subject to quite rapid deterioration, and is exceedingly bulky, so that it cannot be either satisfactorily stored, shipped or transported away from its place of origin.

A still larger proportion of the nutritive values of the corn plant is conserved by using the same for ensilage, as a larger part of the material is made palatable to animals and is, therefore, eaten with less wastage when fed to them. In the cutting of corn fodder for ensilage, however, the stalks are merely chopped or cut transversely into pieces from two to four inches in length, and these pieces are the full diameter of the stalk, so that the same are of such size that they are often rejected and remain uneaten when the material is fed to animals. For use as ensilage, moreover, the plant must be cut and stored while in a green or succulent and immature condition, and the full nutritive value is thus not realized. Also, there is always a considerable percentage of surface spoilage of the material while stored in silos, and some of the nutritive values are lost by the fermentation which the material undergoes. Owing to the bulk of the material, its large moisture content, and the rapidity with which it becomes spoiled when exposed to air, ensilage cannot be satisfactorily transported from its place of origin, and is not available for general commercial feeding purposes.

By the use of my invention I am able to fully overcome the objections to all of the above noted methods of treatment or use of corn fodder and corn stover. The product resulting from the use of my invention contains substantially all of the nutritive values of the entire mature corn plant, in a form which is palatable to animals and is readily eaten by them without waste or rejection of any portion thereof. The product is relatively compact, so as to require a minimum of space for storing or shipping. It does not deteriorate in storage, and will keep indefinitely without loss of its feeding value. The form of the product is such that a minimum expenditure of animal energy is required for the ingestion and digestion of the food, and is also such that the greatest amount of the digestible constituents will be utilized. The product may be combined with other materials to form a properly balanced and economical ration for animals of any class, or to provide a ration having both the proper bulk and relative nutritive values for such varying conditions as—(1) a maintenance ration for unworked horses, (2) a fattening ration for cattle or swine at any of the various feeding or finishing stages, or (3) a ration suitable for dairy cows producing milk of any quantity and quality.

In carrying out my invention I prefer in general to harvest the entire mature corn plant, including the grain or ear, and to subject the material as a whole to the hereinafter described process or treatment, so that the resulting product contains all of the nutritive elements of the mature or fully developed plant. As I have hereinbefore referred particularly to the utilization of corn stover, it may be necessary to state here that, as the grain itself is customarily used for stock feeding purposes, I regard the use thereof in combination with the stover as incidental to the use of the latter, the stover being that element of the combination upon which its novelty depends. It will be understood, and should be kept in mind, that I may employ the stover alone, harvesting the same after the removal of the ears therefrom; but, as the product containing stover alone usually requires the addition of some grain or "concentrates" to bring the nutritive values to a proper balance, this result is usually effected most economically by directly including the grain or ear portions of the plant. It is conceivable, however, that under special conditions, as where the grain has an unusual commercial value and when suitable cheaper concentrates are available, it might be advantageous to harvest the grain and stover separately and subject only the latter to treatment in accordance with my invention.

The matured corn, either fodder or stover, is preferably either left uncut or allowed to remain in the shock until cured or substantially dry. The amount of residual moisture in the cured material will vary more or less under different climatic conditions, but will ordinarily be from 12% to 20%, and any percentage not materially in excess of the latter will be low enough to insure keeping of the material after the processing thereof according to my invention.

After the curing of the fodder or stover, the same is milled or comminuted by any suitable means such that the entire material is reduced to a flaky, meal-like consistency, and so as to pass through a screen of coarse mesh, ranging from ¼ to ½ inch. The largest particles or pieces of the material, when sufficiently milled, should not be much in excess of one inch in length, and pieces of such maximum length should not be of a width much more than one-fourth of the length, and should be relatively thin and flat. The width and thickness of any particles or pieces of the material should preferably not exceed those of the longest pieces. The milling of the material should be so conducted that there will be very little, if any, very fine or dust-like particles therein. As a result of the milling, all of the several parts of the plant are uniformly commingled, and the milled product is of substantially homogeneous consistency. When suitably cured fodder or stover is milled, the product may be sacked or stored in bins without danger of molding, souring, fermentation, or other deleterious changes occurring therein. A suitable designation for the milled material would be "fodder-meal" or "stover-meal," accordingly as the initial or unmilled material is corn-fodder or corn-stover.

The described fodder-meal or stover-meal is preferably subjected immediately to high compression, such as described in my application for patent on forage products and processes for making same, filed November 7, 1918, Serial No. 261,729, whereby to redistribute the moisture or plant juices and flavoring and coloring material uniformly through the mass, and also to reduce the bulk of the material and enable packing, shipping or storing thereof in a minimum space. The compression of the material also tends to crush, break, crumple and weaken the longitudinal fiber of the larger and stiffer pieces of the material, whereby the same are prevented from injuring the mouths of animals when eaten, and so that the material is in condition for digestion, and in a form such as to cause no intestinal injuries, even should it be swallowed without chewing.

When it is desired to provide a properly balanced ration in a single product, and when the desired ration must have a higher content of protein than is normally present in the fodder-meal or stover-meal, the necessary material for bringing the latter product up to the desired nutritive value or ratio is preferably added prior to the compressing operation, so that the entire combination of food ingredients will be subjected to compression, and their moisture, flavor, color, etc. thus more uniformly distributed throughout the compressed mass. Some of the materials which are most suitable for admixture with the fodder-meal or stover-meal are ground alfalfa, linseed and cottonseed meal, soy bean meal, pea hulls, tankage, and like materials having a high protein content and which are obtainable in a ground, granular, flaky or meal-like form. Molasses in moderate quantities may also be mixed with the fodder-meal or stover-meal during the compression thereof, and will be thereby so uniformly distributed through the same as to cause no stickiness or difficulty in handling, and the mixture will not heat or sour if stored in bulk immediately after compression. The principal advantage resulting from the use of molasses in the composition, is the increased palatability to animals which is thereby conferred. As a further means of increasing palatability, I prefer in most instances to add a small percentage of salt to the composition just prior to compression thereof, or as the material is entering the compressing machine. The distribution of the salt throughout the compressed mass is facilitated by dissolving the same to form a brine, which, under compression, passes into all parts of the material, so that the added moisture is absorbed and becomes imperceptible in the resultant mass. When molasses is used in the composition, the brine may be mixed therewith, and the mixture introduced into the fodder-meal in suitable proportions just prior to compression thereof.

The cakes or blocks of material resulting from the compressing operation may be stored or transported without further treatment, and may be fed to many animals without being disentegrated, as the blocks or cakes are sufficiently friable to enable portions thereof to be readily broken or bitten off, and the masses are easily disintegrable by chewing. If desired, however, the compressed material may be broken up or disintegrated prior to storage or shipment thereof, and when this is done it is found that the bulk of the disintegrated material is very considerably less than that of the loose material or meal prior to compression. It is noted in particular that the thickness of the larger pieces of the stalk and stem parts of the fodder or stover remain materially less than before the compression thereof, so that the flaky consistency and appearance of the material is enhanced. Of course, as the moisture, color and flavor of the different components are redistributed and made substantially uniform throughout by the compressing thereof, the disintegrated material will partake of the same qualities, so that all of the material will be uniformly palatable and acceptable to animals, and will be eaten without rejection or waste of any part thereof. In fact, the fodder-meal itself, prior to compression, owing to its comminuted and uniformly mixed condition is of such a form and consistency as to make it exceedingly difficult for an animal to pick over and reject any portion thereof, and it is found that there is no tendency for animals so to do.

In order to afford a detailed comparison of their food values, and to show the results attainable by combining the fodder-meal or stover-meal with certain other materials, I am showing below in tabulated form analyses of average specimens of certain of the materials, and combinations thereof, as follows:

| | Dent corn grain. | Corn fodder meal. | Corn stover meal. | Alfalfa meal. | Cotton seed meal. | Linseed meal. |
|---|---|---|---|---|---|---|
| Dry matter (%) | 89.5 | 81.7 | 81.0 | 91.4 | 92.1 | 90.4 |
| Total digestible nutrients | 85.7 | 53.7 | 46.1 | 51.6 | 74.8 | 75.9 |
| Crude protein | 7.5 | 3.0 | 2.1 | 10.6 | 31.6 | 31.7 |
| Carbohydrates | 67.8 | 47.3 | 42.4 | 39.0 | 25.6 | 37.9 |
| Fats | 4.6 | 1.5 | .7 | .9 | 7.8 | 2.8 |
| Nutritive ratio (protein: carbohydrates (1) plus fats × 2.25) | 10.4 | 16.9 | 21.0 | 3.9 | 1.4 | 1.4 |

| Combinations. | Total digestible nutrients. | Crude protein. | Nutritive ratio. 1: |
|---|---|---|---|
| Fodder-meal 3 parts<br>Alfalfa meal 1 part | 53.2 | 4.9 | 9.8 |
| Fodder-meal 2 parts<br>Alfalfa-meal 1 part | 53.0 | 5.5 | 8.6 |
| Stover-meal 10 parts<br>Alfalfa-meal 2 "<br>Cottonseed-meal 1 part | 49.1 | 5.6 | 7.7 |
| Stover-meal 8 parts<br>Alfalfa-meal 2 "<br>Cottonseed-meal 1 part | 49.7 | 6.3 | 6.9 |
| Stover-meal 6 parts<br>Alfalfa-meal 2 "<br>Cottonseed-meal 1 part | 50.5 | 7.3 | 5.9 |
| Stover-meal 4 parts<br>Alfalfa-meal 2 "<br>Cottonseed-meal 1 part | 51.8 | 8.7 | 4.9 |

In those of the above combinations which are shown as including cotton seed meal, linseed meal or other high-protein feeds may be substituted with substantially the same result in lowering the nutritive ratio. It will be apparent that by simple combinations, such as indicated, stock-foods having any desired nutritive ratio may be readily prepared, and the nutritive values of the fodder-meal or stover-meal properly balanced.

Now, having described my invention, what I claim and desire to secure by Letters Patent is:

1. An animal food product consisting principally of mature and cured corn stover comminuted to thin flaky particles of a length averaging less than one inch, and having the parts thereof flattened and crushed by pressure.

2. An animal food product comprising mature and cured corn stover comminuted to thin flat particles, in combination with comminuted high-protein stock-food materials, the combined ingredients being uniformly commingled and having their moisture, color and flavor redistributed by pressure applied thereto subsequently to the mixture thereof.

3. An animal food product consisting of corn stover meal from the mature cured plant, in combination with comminuted high-protein stock-food materials in proportions to form a substantially balanced ration, the materials being intimately commingled and compressed.

LEE C. SHARP.